United States Patent
Saeki et al.

(10) Patent No.: US 9,780,882 B2
(45) Date of Patent: Oct. 3, 2017

(54) OPTICAL TRANSMITTER MODULE HAVING MULTIPLE SIGNAL LANES

(71) Applicant: Sumitomo Electric Industries, Ltd., Osaka-shi (JP)

(72) Inventors: Tomoya Saeki, Yokohama (JP); Munetaka Kurokawa, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/831,492

(22) Filed: Aug. 20, 2015

(65) Prior Publication Data

US 2016/0028489 A1 Jan. 28, 2016

Related U.S. Application Data

(63) Continuation-in-part of application No. 14/707,468, filed on May 8, 2015.

(30) Foreign Application Priority Data

May 13, 2014 (JP) .................................. 2014-099315
Aug. 20, 2014 (JP) .................................. 2014-167416

(51) Int. Cl.
*H04B 10/50* (2013.01)
*H04J 14/02* (2006.01)
(Continued)

(52) U.S. Cl.
CPC ............. *H04B 10/506* (2013.01); *G02B 6/32* (2013.01); *G02B 6/42* (2013.01); *H04B 10/503* (2013.01);
(Continued)

(58) Field of Classification Search
CPC ...... H04B 10/506; H04B 10/503; G02B 6/32; G02B 6/42; H04J 14/02; Y10T 29/49897
See application file for complete search history.

(56) References Cited

U.S. PATENT DOCUMENTS 2,165,341 A * 7/1939 Capstaff .................... G02B 7/10
359/641
4,823,357 A * 4/1989 Casey .................. G02B 6/4246
359/568
(Continued)

FOREIGN PATENT DOCUMENTS

JP    2006-139060 A     6/2006
JP    2006139060 A  *  6/2006
(Continued)

OTHER PUBLICATIONS

Park et al., Micromachined lens microstages for two-dimensional forward optical scanning, Opt. Express 18, 16133-16138 (2010).*
Office Action in U.S. Appl. No. 14/707,468, dated Mar. 24, 2016.

*Primary Examiner* — Peter Radkowski
(74) *Attorney, Agent, or Firm* — Venable LLP; Michael A. Sartori; Laura G. Remus

(57) ABSTRACT

An optical transmitter module that generates a signal multiplexing two or more optical signals each having optical power satisfying a preset magnitude is disclosed. The optical transmitter module includes laser diodes (LD), adjusting lenses coupled with the LDs to generate dispersive optical outputs, and a concentrating lens that concentrates the dispersive optical beams onto a coupling fiber. A feature of the optical transmitter module is that the adjusting lenses are set closer to the LDs to adjust the optical power coupled with the coupling fiber.

10 Claims, 10 Drawing Sheets

(51) Int. Cl.
*G02B 6/32* (2006.01)
*G02B 6/42* (2006.01)
(52) U.S. Cl.
CPC ......... *H04J 14/02* (2013.01); *Y10T 29/49897* (2015.01)

(56) References Cited

U.S. PATENT DOCUMENTS

| | | | | |
|---|---|---|---|---|
| 5,604,630 A * | 2/1997 | Palmer | .................. | G02B 23/12 359/355 |
| 5,787,215 A * | 7/1998 | Kuhara | .................. | H01L 31/12 257/E31.095 |
| 6,094,515 A * | 7/2000 | Miki | .................... | G02B 6/4203 385/31 |
| 6,404,955 B1 * | 6/2002 | Kikuchi | .................. | G02B 6/32 385/35 |
| 6,421,177 B1 * | 7/2002 | Leyva | ................ | G02B 6/29302 359/288 |
| 6,539,035 B1 * | 3/2003 | Yoda | .................... | G02B 6/4206 359/619 |
| 6,600,849 B2 * | 7/2003 | Ducellier | ............. | G02B 6/3586 385/16 |
| 6,731,659 B1 * | 5/2004 | Tsai | .......... | G01J 3/26 372/18 |
| 7,076,132 B2 * | 7/2006 | Ryall | .................. | G02B 6/2937 385/31 |
| 7,253,897 B2 * | 8/2007 | Moon | ...................... | G01J 3/02 356/308 |
| 7,463,828 B2 * | 12/2008 | Moon | ...................... | G01J 3/02 359/17 |
| 8,625,989 B2 * | 1/2014 | Du | ...................... | G02B 6/4215 398/43 |
| 2002/0076136 A1 * | 6/2002 | Ducellier | ............. | G02B 6/3586 385/17 |
| 2002/0181102 A1 * | 12/2002 | Leyva | ................ | G02B 6/29302 359/487.02 |
| 2003/0007148 A1 * | 1/2003 | Moon | ...................... | G01J 3/02 356/328 |
| 2004/0114865 A1 * | 6/2004 | Ryall | .................. | G02B 6/2937 385/39 |
| 2004/0114883 A1 * | 6/2004 | Furuichi | .............. | G02B 6/4206 385/93 |
| 2004/0246477 A1 * | 12/2004 | Moon | ...................... | G01J 3/02 356/300 |
| 2006/0274434 A1 * | 12/2006 | Mino | ...................... | G02B 6/4214 359/811 |
| 2010/0214639 A1 * | 8/2010 | Watson | ................ | G02B 21/002 359/213.1 |
| 2012/0189306 A1 * | 7/2012 | Du | ...................... | G02B 6/4215 398/65 |

FOREIGN PATENT DOCUMENTS

JP          2007-212795 A      8/2007
JP          2007212795 A *      8/2007

* cited by examiner

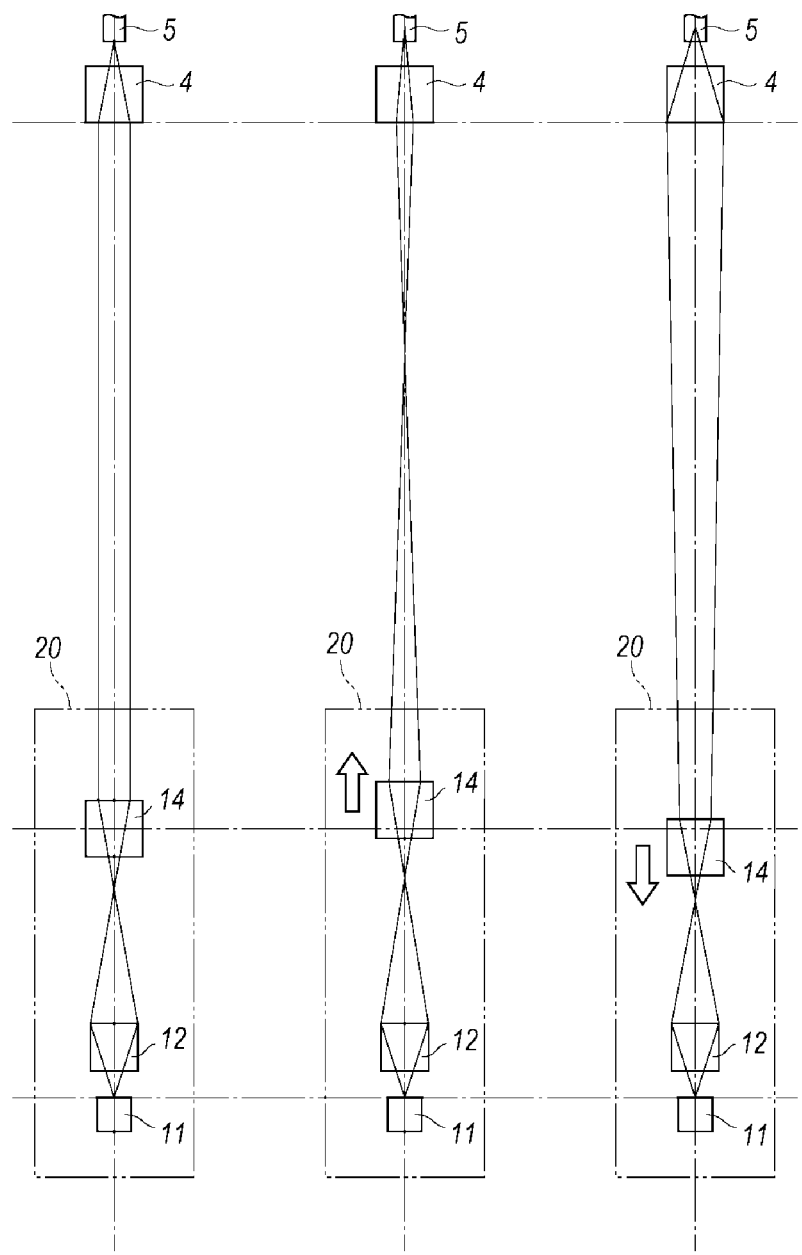

OPTICAL TRANSMITTER MODULE HAVING MULTIPLE SIGNAL LANES

CROSS-REFERENCE TO RELATED APPLICATIONS

This patent application is a continuation-in-part of pending prior U.S. patent application Ser. No. 14/707,468, filed May 8, 2015 by Tomoya Saeki et al. for METHOD TO PRODUCE OPTICAL MODULE HAVING MULTIPLE SIGNAL LANES AND OPTICAL MODULE, which is hereby incorporated by reference. This patent application also claims priority to Japanese Patent Application No. 2014-167416, filed Aug. 20, 2014, which is hereby incorporated by reference in its entirety.

BACKGROUND OF THE INVENTION

1. Field of the Invention

The present application relates to an optical transmitter module implementing a plurality of optical sources.

2. Background Arts

An optical transmitter module, the optical power output therefrom and detected through an optical fiber coupled with the optical transmitter module sometimes exceeds a preset magnitude in a case where a laser diode (LD) installed in the optical transmitter module is adequately aligned with the optical fiber. Decreasing the bias current supplied to the LD to reduce the optical power, the LD degrades high-frequency performance thereof due to a decrease of the resonance frequency. Accordingly, the coupling efficiency between the optical fiber and the LD may be adjusted by shifting the optical fiber from a position at which the optical fiber and the LD shows a maximum coupling efficiency, which is often called as de-focusing.

When the optical transmitter module implements a plurality of channels (or lanes) each including an LD that emits light with a wavelength specific thereto and different from others, such plurality of optical signals are multiplexed and couple with one optical fiber. When the de-focusing described above is performed for one channel, or between one LD and the optical fiber, the other LDs or the coupling efficiencies between the other LDs and the optical fiber do not always satisfy the requested specification. Usually, the output power detected through the optical fiber and originated to the other LDs exceeds the preset limitation or become insufficient.

SUMMARY OF THE INVENTION

One aspect of the present application relates to an optical transmitter module that comprises a plurality of lanes, a concentrating lens, and an optical fiber. Each of the lanes includes a semiconductor laser diode (LD) and an adjusting lens. The LD emits an optical signal from a light-emitting point thereof. The optical signal has a wavelength specific to respective lanes. The adjusting lens passes the optical signal output from the LD in dispersive. A feature of the optical transmitter module of the present application is that the adjusting lenses in respective lanes are used for adjusting the optical power coupled with the optical fiber through the concentrating lens.

Another aspect of the present application relates to a method to assemble an optical transmitter module that includes a plurality of lanes, each of which includes a laser diode (LD) that emits an optical signal and an adjusting lens optically coupled with the LD. The method comprises steps of (a) placing the adjusting lens on a point at which the optical signal passing through the adjusting lens becomes a collimated beam; and (b) shifting the adjusting lens toward the LD such that the optical signal detected through an optical fiber, which couples with the adjusting lens through a concentrating lens, becomes a preset magnitude.

BRIEF DESCRIPTION OF DRAWINGS

The foregoing and other purposes, aspects and advantages will be better understood from the following detailed description of a preferred embodiment of the invention with reference to the drawings, in which:

FIGS. 7A to 7C schematically show the positional relations between the pre-focusing lens, the adjusting lens, the concentrating lens and the coupling fiber;

DESCRIPTION OF EMBODIMENTS

Next, some embodiments of the present invention will be described as referring to drawings. In the description of the drawings, numerals or symbols same with or similar to each other will refer to elements same with or similar to each other without duplicated explanations.

First Embodiment

Figure 1:
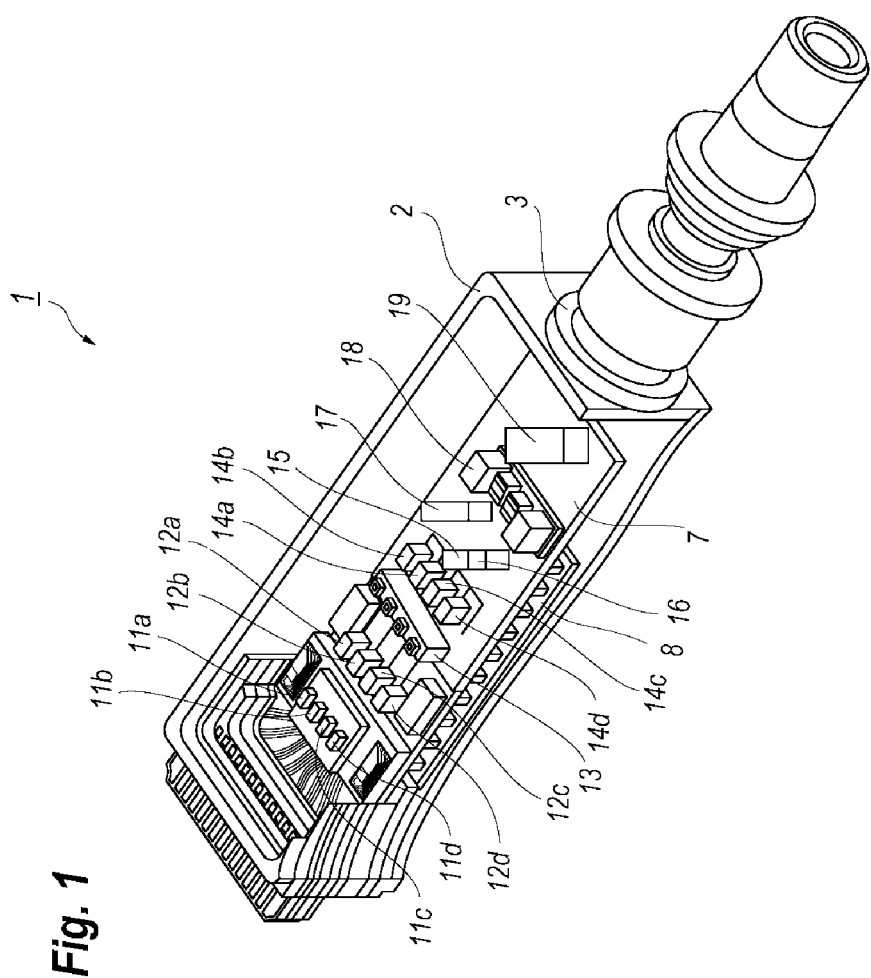
FIG. 1 shows an inside of an optical transmitter module according to the present application.
Figure 2:
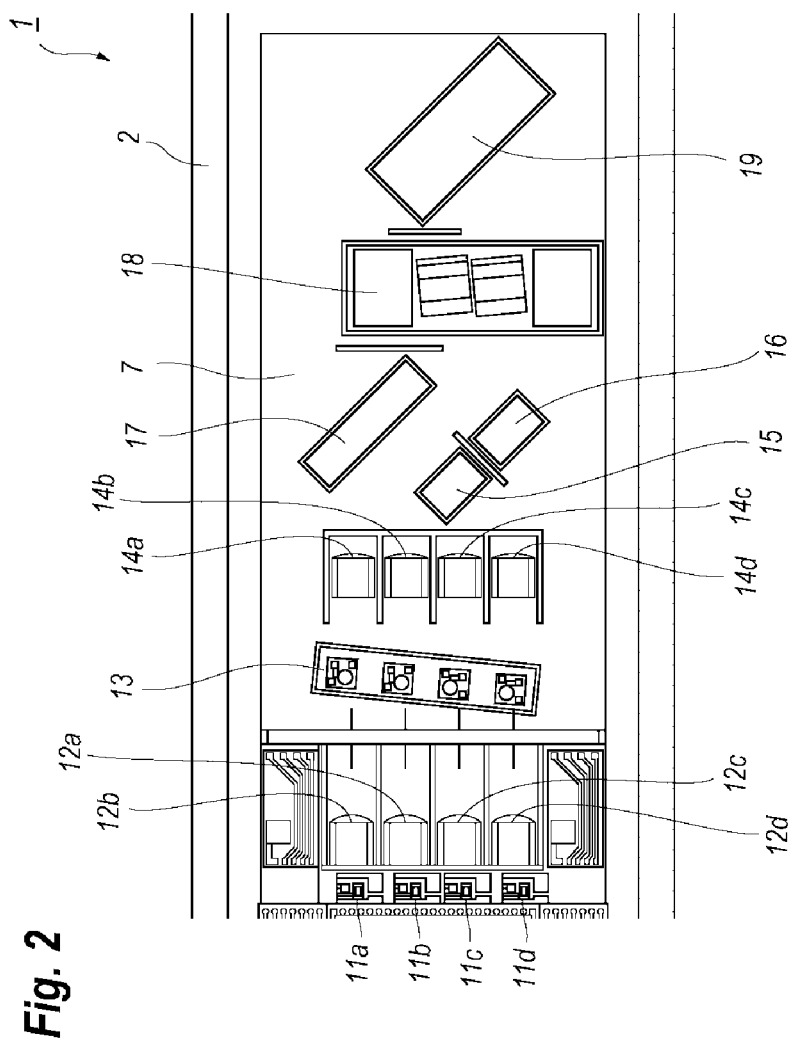
FIG. 2 is a plan view of the inside of the optical transmitter module shown in FIG. 1.

FIG. 1 shows an inside of an optical transmitter module according to the present invention, and FIG. 2 is a plan view of the inside thereof. As illustrated in FIGS. 1 and 2, the optical transmitter module 1 of the present embodiment provides a box shaped housing 2 and a cylindrical coupling portion 3. The housing 2 installs four LDs, 11a to 11d, as light emitting devices, four pre-focusing lenses, 12a to 12d, a beam splitter (BS) 13, four adjusting lenses, 14a to 14d, two wavelength division multiplexing (WDM) filters, 15 and 16, a mirror 17, an optical isolator 18, and a polarization beam combiner (PBC) 19. Thus, the optical transmitter module 1 is a type of the multi-channel module including four LDs, 11a to 11d, four pre-focusing lenses, 12a to 12d, and four adjusting lenses, 14a to 14d. These optical components are mounted on a thermo-electric cooler (TEC) 8 through a base 7. The TEC 8 may control a temperature of the LDs, 11a to 11d, to stabilize the emission wavelengths thereof.

The pre-focusing lenses, 12a to 12d, optically couple with respective LDs, 11a to 11d, and the adjusting lenses, 14a to 14d. The explanation below sometimes collectively calls the LDs, 11a to 11d, as an LD 11; the pre-focusing lenses, 12a to 12d, as a pre-focusing lens 12 optically coupled with the LD 11, and the adjusting lenses, 14a to 14d, as an adjusting lens 14 optically coupled with the pre-focusing lens 12.

Furthermore, the explanation below assumes a direction "forward" or "front" as the side where the optical coupling portion 3 is provided with respect to the housing 2; while, a direction "rear" or "back" as that the LDs, 11a to 11d, is provided with respect to the pre-focusing lenses, 12a to 12d. A direction "lateral" is further assumed to be a direction where the LDs, 11a to 11d, the pre-focusing lenses, 12a to 12d, and the adjusting lenses, 14a to 14d are arranged in an array, that is, a direction in parallel to a bottom of the housing.

In the optical transmitter module 1 of the present embodiment, the LDs, 11a to 11d, are driven independently; that is, the LDs, 11a to 11d, each generates an optical signal different from others. The optical signals emitted from respective LDs, 11a to 11d, enter the pre-focusing lenses, 12a to 12d. Because the LDs, 11a to 11d, are placed on respective positions longer than focuses of respective pre-focusing lenses, 12a to 12d. That is, the pre-focusing lenses, 12a to 12d, operate as concentrating lenses.

The optical signals concentrated by the pre-focusing lenses, 12a to 12d, are split by the BS 13, then enters the adjusting lenses, 14a to 14d. The BS 13 mounts monitor photodiodes (PD) thereon. Portions of the optical signals split by the BS 13 enter respective monitor PDs and provided for adjusting the output power of the LDs, 11a to 11d. Rest portions of the optical beams are converted to substantially collimated beams by the adjusting lenses, 14a to 14d. As described later, the adjusting lenses, 14a to 14d, do not convert the optical signals into exact collimated beams because the adjusting lenses, 14a to 14d, are placed such that the respective focal points in the side of the pre-focusing lenses, 12a to 12d, are slightly offset from the focal points of the pre-focusing lenses, 12a to 12d.

Figure 3:
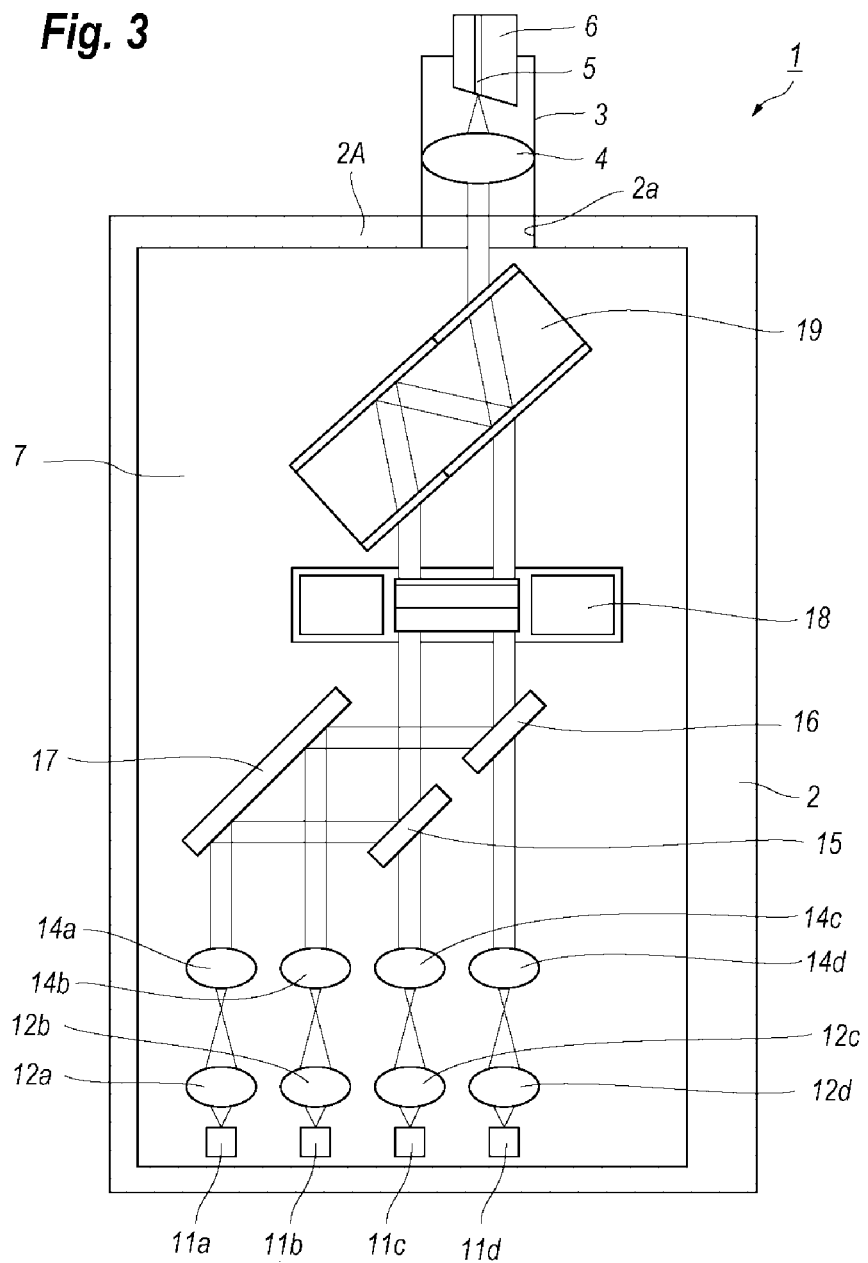
FIG. 3 schematically shows an optical coupling system of the optical transmitter module shown in FIG. 1.

FIG. 3 schematically illustrates an optical coupling system of the optical transmitter module 1 from the LDs, 11a to 11d, to the optical fiber 5. The optical signals output from the adjusting lenses, 14a to 14d, are multiplexed as passing the first and second WDM filters, 15 and 16, the mirror 17, the isolator 18, and the PBC 19. The multiplexed optical signal is externally guided passing through the window 2a in the front wall 2A of the housing, and concentrated on an end of an optical fiber 5 secured in a center of a stub 6, where the concentrating lens 4 and the stub 5 are provided in the coupling portion 3 of the optical transmitter module 1. Coupling an external fiber with the stub as abutting an end thereof against the end of the stub 6, the multiplexed optical signal may be output from the optical transmitter module 1 to an external fiber.

An optical transmitter module, in particular, an optical transmitter module implementing a laser diode as an optical signal source inevitably adjusts the optical output power thereof. That is, the optical output power of the optical transmitter module is severely restricted in a value less than a preset one due to the eye safety against the laser light. The conventional optical transmitter module often adjusts or restricts the optical output power thereof by de-focusing the optical fiber 5, which is often called as the coupling fiber, with respect to the concentrating lens 4. That is, offsetting the position of the end of the coupling fiber 5 from the focal point of the concentrating lens 4, the power optically coupled with the coupling fiber 5 may be adjusted. When the end of the coupling fiber 5 is at the focal point of the concentrating lens 4, the optical power output from the other end of the coupling fiber 5, that is, the power to be coupled with the external fiber, becomes the maximum. Offsetting the end of the coupling fiber 5 from the focal point, the power output from the coupling fiber 5 reduces. However, the present optical transmitter module 1 adjusts the optical output power of respective lanes by sliding the adjusting lenses, 14a to 14d, along respective optical axes.

Describing the optical transmitter module 1 of the present embodiment further specifically, the optical coupling system shown in FIG. 3 multiplexes four optical signals output from respective LDs, 11a to 11d, as converting into collimated beams by the adjusting lenses, 14a to 14d. The concentrating lens, namely, the concentrating lens 4 in the coupling portion 4 concentrates the multiplexed optical signal on the coupling fiber 5. As long as the concentrating lens 4 has an effective diameter enough large compared with a field pattern of the multiplexed optical signals, the concentrating lens 4 may concentrate all of the optical signals on the coupling fiber 5 even if the optical signals passing the adjusting lenses, 14a to 14d, show offsets around respective optical axes. Also, the optical power coupled in the coupling fiber 5 for respective optical signals depends on the outputs of the LDs, 11a to 11d, and the optical coupling efficiency between the LDs, 11a to 11d, and the coupling fiber 5.

The LDs, 11a to 11d, may output optical signals with power thereof around 10 dBm. The optical loss in the optical system from the LDs, 11a to 11d, to the coupling fiber 5 is typically 2 to 3 dB. On the other hand, the IEEE standard (100 GBASE-LR4) rules optical power output from an optical transmitter module to be 4.5 dBm at most. Thus, the optical transmitter module 1 in the output power thereof exceeds the maximum power allowable in the standard without reducing the optical coupling efficiency of the optical signals coming from the LDs, 11a to 11d, with the coupling fiber 5.

Conventional technique for reducing the coupling power with the optical fiber 5 is the de-focusing, which sets the end of the fiber away from the focal point of the lens 4. However, the de-focusing becomes effective for a single optical signal, that is, when the optical transmitter module 1 implements only one LD. In an optical transmitter module implementing a plural LD and outputting an optical signal multiplexing the optical signals each output from the LDs, each optical signals couple with the coupling fiber 5 by respective coupling efficiency different from others. Accordingly, the de-focusing of the optical fiber 5, which means that a distance between the concentrating lens 4 and the end of the optical fiber 5 are varied, may vary the coupling efficiency of the optical signals in respective degrees specific thereto and different from others. Accordingly, even when the output power for one LD is adequately adjusted by de-focusing the position of the optical fiber 5, the coupling efficiencies for the rest LDs result in an excess compensation or an insufficient attenuation.

Figure 9:
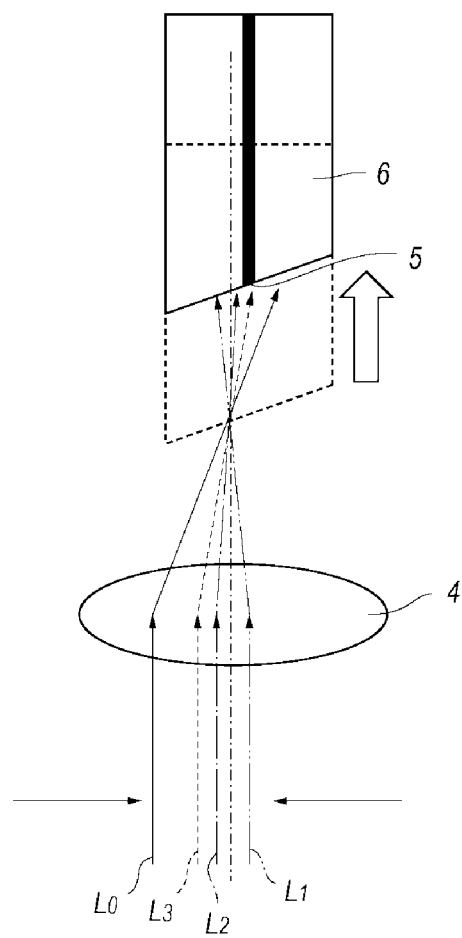
FIG. 9 describes the adjustment of the optical output power according to a conventional technique.

Describing the scattering of the optical coupling efficiency further specifically as referring to FIG. 9; when four collimated signals, $L_0$ to $L_3$, enters the concentrating lens 4 by respective optical axes offset from others, the optical axes toward the coupling fiber 5 from the concentrating lens 4 show angles different from others. As long as the optical axes entering the concentrating lens 4 is within the effective aperture of the lens 4, the optical axes from the concentrating lens 4 may concentrate on a point to shows the substantial coupling efficiency against the coupling fiber 5.

However, shifting or de-focusing the end of the coupling fiber 5 to adjust the coupling efficiency against the coupling fiber 5, the coupling loss or the de-focusing for respective optical axes is uneven because of the irregular angles of respective optical axes toward the coupling fiber 5, which results in the over attenuation or insufficient reduction of the output power for optical signals not subject to the adjustment.

The present invention; accordingly, the adjustment of the optical output power for respective optical signals is performed by offsetting the position of the adjusting lenses, 14a to 14d, from respective positions at which the optical signals output from the adjusting lenses, 14a to 14d, become substantially collimated beams. Because the optical output power for respective optical signals is adjusted independently, the optical transmitter module 1 may output the optical signals with adjusted and adequate power.

Next, a method to adjust the optical power coupled with the coupling fiber 5 will be specifically described. The optical transmitter module 1 of the present embodiment implements the three-lens system; that is, the pre-focusing lenses, 12a to 12d, concentrate the optical signals output from the LDs, 11a to 11d, by the magnification ratio of 5 to 6. The magnification ratio of 5 to 6 is adequate for coupling light output from a distributed feedback (DFB) LD with a single mode fiber. The concentrating lens 4, which is set out of the housing 2, concentrates the multiplexed optical signals passing through the window 2A of the housing 2 on the optical fiber 5, usually, the end of the coupling fiber 5.

The pre-focusing lenses, 12a to 12d, have a focal length of 0.45 mm to show the magnification ratio of 5 to 6, while, the adjusting lenses, 14a to 14d, have a focal length of 0.85 mm, which shows the magnification ratio of unity. These optical system having the pre-focusing and adjusting lenses, 12a to 12d and 14a to 14d, require the highest positional preciseness for the pre-focusing lenses, 12a to 12d, but allow rough positions for the adjusting lenses, 14a to 14d, which means that the adjusting lenses, 14a to 14d, in respective positions may adjust the optical coupling efficient against the optical fiber 5.

Also, an optical coupling system implementing two lenses, one is for collimating light and the other is for concentrating the collimated light, requests the positional accuracy for the collimating lens smaller than 0.3 μm. On the other hand, when the optical system implementing three lenses like the present module 1, the adjusting lens, namely, collimating lens is requested in the positional accuracy thereof to be less than 1.5 μm, which is five times greater than that for the two lens system described above. Lenses are generally fixed by epoxy resin curable with ultraviolet rays. Such resin shrinks as curing, or expands by thermal processes, which results in the finest positional accuracy of about 1 μm for elements fixed by the resin.

Also, the optical transmitter module 1 sets the magnification ratio of the pre-focusing lenses, 12a to 12d, of 5 to 6, which may narrow the field pattern of the collimated beams output from the adjusting lenses, 14a to 14d, to about 0.6 to 0.2 mm. Thus, the optical system set downstream of the adjusting lenses, 14a to 14d, may be formed in compact.

Next, alignment procedures of the lenses, 12a to 14d in the optical transmitter module 1 will be specifically described. First, the process sets the LDs, 11a to 11d, in respective designed positions and performs the wiring to the LDs, 11a to 11d, to activate the LDs, 11a to 11d, practically. Then, the first and adjusting lenses, 12a to 14d, and the concentrating lens 4 are aligned as follows.

Figure 4A:
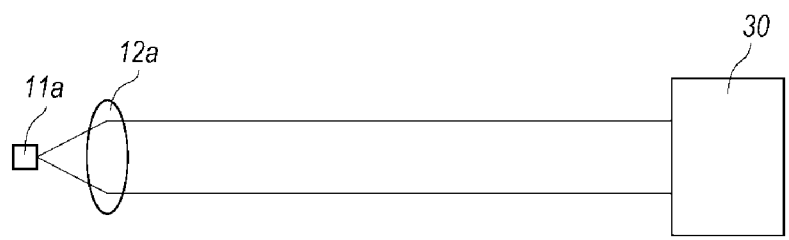
FIG. 4A shows a process to align the pre-focusing lens against the LD.

As schematically illustrated in FIG. 4A, the process positions the pre-focusing lens 12a with respect to the LD 11a. In order to actively align the lens 12a, the optical output from the LD 11a and passes through the lens 12a is necessary to be brought out of the housing 2. A special tool like a periscope may perform the parallel translation of the optical beam output from the LD 11a.

Setting a detector, typically a camera, in a position enough far from the housing, about 1 meter apart from the housing in the present embodiment, and detecting the optical beam output from the LD 11a and passing through the pre-focusing lens 12a by the special tool described above, the process aligns the pre-focusing lens 12a in a position at which the optical beam output from the pre-focusing lens 12a becomes a collimated beam. The position of the pre-focusing lens 12a thus investigated is that the LD 11a in the optical output point thereof is on the focal point of the pre-focusing lens 12a. Then, the pre-focusing lens 12a is offset from the position by a preset amount so as to be apart from the LD 11a. Thus, the pre-focusing lens 12a shows the magnification ratio of 5 to 6 for the LD 11a.

Figure 4B:
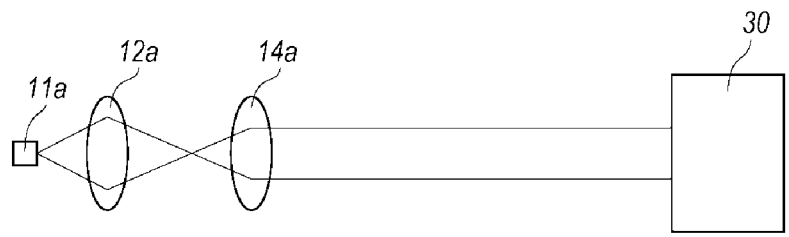
FIG. 4B shows a process to align the adjusting lens against the pre-focusing lens.
Figure 4C:
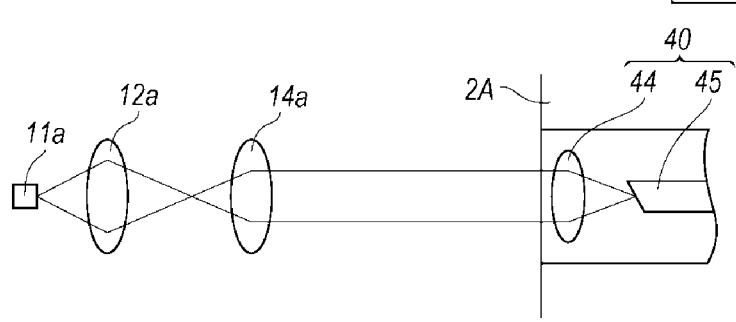
FIG. 4C shows a process to align the tool that imitates the concentrating lens and the optical fiber with the adjusting lens.

The process then carries out the alignment of the adjusting lens 14a against the pre-focusing lens 12a as shown in FIG. 4B. Specifically, monitoring the field pattern of the optical beam output from the adjusting lens 14a by the detector (camera) set far enough from the housing, the adjusting lens 14a is set on the position at which the optical beam thus detected becomes a collimated beam. The process next prepares another tool 40 shown in FIG. 4C. The tool 40 imitates the concentrating lens 4 and the optical fiber 5. Specifically, the tool 40 prepares a lens 44 and an optical fiber 45 that reproduce the positional relation between the concentrating lens 4 and the optical fiber 5. An end surface of the optical fiber 45 exists on the optical axis of the lens 44 and on the focal point of the lens 44.

Figure 4D:
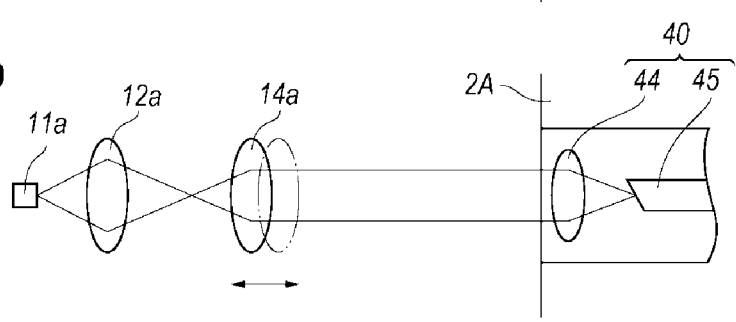
FIG. 4D shows a process to find the portion of the adjusting lens at which the optical power coupled with the tool becomes the designed power.

The tool 40 is set on a position where the coupling portion 3 is practically set with respect to the housing 2, which is called as a designed position. Then, the adjusting lens 14a is adjusted such that the optical power output from the optical fiber 45 becomes the preset designed power. The initial position of the adjusting lens 14a is determined in advance such that the optical beam output from the adjusting lens 14a becomes a collimated beam, which means that the focal point of the adjusting lens 14a in the side of the pre-focusing lens 12a coincides with the focal point of the pre-focusing lens 12a in the side of the adjusting lens 14a. The alignment of the adjusting lens 14a may be carried out by, sliding the adjusting lens 14a along the optical axis thereof as shown in FIG. 4D and finding the position of the adjusting lens 14a at which the optical power output from the optical fiber 45 becomes the designed power. Finally, the adjusting lens 14a may be fixed by curing the resin.

The process then performs the optical alignment for the other combinations of the LD, 11b to 11d, the pre-focusing lenses, 12b to 12d, and the adjusting lenses, 14b to 14d. However, during the alignment for those lenses, 12b to 14d, the tool 40 is left in the initial position for the alignment of the first combination of the pre-focusing lens 12a and the adjusting lens 14a.

After the alignment of all lenses, 12a to 14d, are carried out, the process detaches the tool 40 from the housing 2. Then, the process sets the practical coupling portion 3 including the concentrating lens 4 and the optical fiber 5 on the rear wall 2A of the housing 2. Specifically, the coupling portion 3 is first slid on the rear wall 2A as keeping the positional relation between the lens 4 and the optical fiber 5 to find the position at which the optical output power from the optical fiber 5 becomes a maximum. Then, the optical fiber 5 in a distance against the concentrating lens 4 is aligned in a position at which the optical output power from the optical fiber 5 becomes a maximum. Because the process adjusts the positions of the adjusting lenses, 14a to 14d, such that the respective optical beam output from the adjusting lenses, 14a to 14d, couple with the optical fiber 5 by the designed efficiency, the alignment of the optical fiber 5 along the optical axis of the concentrating lens 4 reproduces the coupling efficiency of respective optical beams with the optical fiber 5. Finally, the coupling portion 3 is fixed to the rear wall 2A of the housing 2 by, for instance, the YAG laser welding.

The alignment of the adjusting lenses, 14a to 14d, to adjust the optical output power from the optical transmitter module 1 may be carried out in two ways, one of which slides the adjusting lenses, 14a to 14d, closer to the LDs, 11a to 11d, and the other moves the adjusting lenses, 14a to 14d, closer to the concentrating lens 4.

Figure 5A:
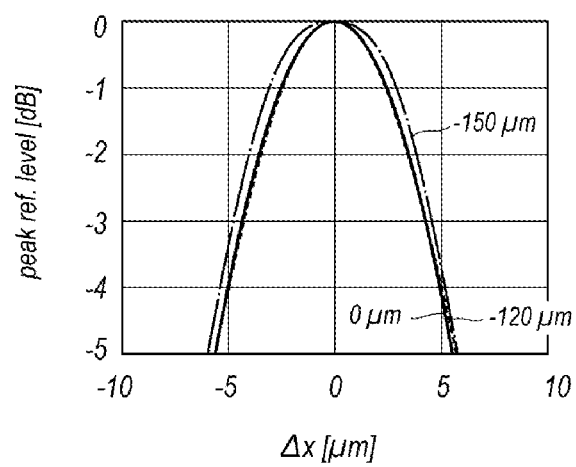
FIGS. 5A and 5B compares the alignment tolerance of the adjusting lenses along a direction perpendicular to the optical axis of the adjusting lenses, when the adjusting lenses are set closer to the pre-focusing lenses shown in FIG. 5A and to the concentrating lens in FIG. 5B.
Figure 5B:
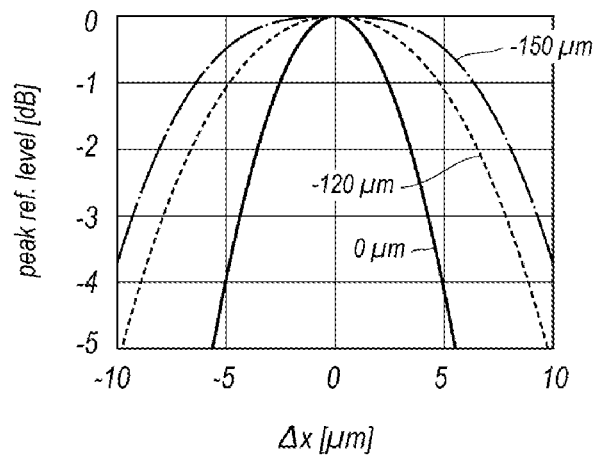

However, as schematically illustrated in FIG. 5B, when the adjusting lenses, 14a to 14d, are set closer to the concentrating lens 4, that is, apart from the pre-focusing lenses, 12a to 12d; the tolerance of the coupling efficiency to the optical fiber 5 may be enhanced compared with a case where the adjusting lenses, 14a to 14d, are set closer to the pre-focusing lenses, 12a to 12d. FIGS. 5A, and 5B compares the alignment tolerance of the adjusting lenses, 14a to 14d, perpendicular to the optical axis of the adjusting lenses, 14a to 14d, when the adjusting lenses, 14a to 14d, are set closer to the pre-focusing lenses, 12a to 12d, shown in FIG. 5A and set closer to the concentrating lens 4 in FIG. 5B. Thus, the adjustment of the optical output power by shifting the adjusting lenses, 14a to 14d, may be simplified.

Figure 6:
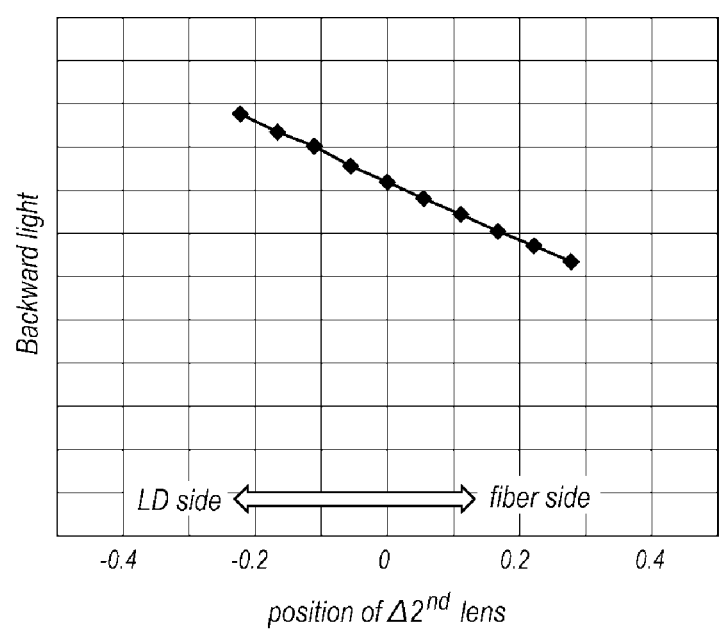
FIG. 6 shows a behavior of the backward light against the position of the adjusting lens.

Also, as shown in FIG. 6, the arrangement for the adjusting lenses, 14a to 14d, set closer to the concentrating lens 4 may reduce the reflection of the optical signals by the adjusting lenses, 14a to 14d, back to respective LDs, 11a to 11d, because the arrangement expands a distance between the pre-focusing lenses, 12a to 12d, and the adjusting lenses, 14a to 14d, which reduces the aperture of the pre-focusing lenses, 12a to 12d, viewed from the adjusting lenses, 14a to 14d. When the adjusting lenses, 14a to 14d, and the concentrating lens 4 have respective focal lengths of 1.5 to 2.5 mm, the enhancement of the coupling tolerance of the adjusting lenses, 14a to 14d, with the optical fiber 5 and the reduction of the backward reflection may be consistent.

FIGS. 7A to 7C, which show relative positions of the adjusting lens 14 and the concentrating lens 4, explain the direction of the alignment of the adjusting lenses, 14a to 14d, further specifically. FIG. 7A shows the arrangement when the first and adjusting lenses, 12 and 14, coincide respective focal points. In such arrangement, the optical beam output from the adjusting lens 14 becomes a collimated beam. FIG. 7B shows another arrangement where the adjusting lens 14 is set closer to the concentrating lens 4. Under such an arrangement, the optical beam output from the adjusting lens 14 becomes a convergent beam. Lastly, FIG. 7C shows the last arrangement where the adjusting lens 14 is set closer to the pre-focusing lens 12 and the optical beam output from the adjusting lens 14 becomes dispersive.

As schematically illustrated in FIGS. 7B and 7C, when the optical beam output from the adjusting lens 14 is a dispersive beam or a concentrating beam, the optical beam does not focus on the end of the optical fiber 5 no longer, but the focal point or the beam waist enters within the optical fiber 5. That is, the focal point or the beam waist becomes apart from the concentrating lens 5 compared with the arrangement where the adjusting lens 14 in the focal point thereof coincides with the focal point of the pre-focusing lens 12, namely, the collimated optical beam being output from the adjusting lens 14. Accordingly, when the optical beam output from the adjusting lens 14 is dispersive or convergent, the optical coupling efficiency with the optical fiber 5 reduces.

The optical coupling efficiency with the optical fiber 5 is necessary to take the tracking error into account, that is, physical dimensions of respective optical components, such as lenses, 12, 14, and 4, and the optical fiber 5, vary depending on temperatures; that is, thermal expansion of respective components may vary the optical coupling efficiency. As described, the concentrating lens 4 and the optical fiber 5 are implemented within the coupling portion 3 out of the housing 2, which means two components of the concentrating lens 4 and the optical fiber 5 are affected by an external ambient temperature and a temperature of the housing 2. On the other hand, the first and adjusting lenses, 12 and 14, are implemented within the housing 2, more specifically, on the thermo-electric cooler (TEC) within the housing 2. Accordingly, the lenses, 12 and 14, may be stabilized in the temperatures thereof.

When the ambient temperature rises, the coupling portion 3 thermally expands such that the optical fiber 5 becomes apart from the concentrating lens 4. That is, in the optical coupling system schematically shown in FIGS. 7B and 7C, the end of the optical fiber 5 becomes closer to the focal point of the concentrating lens 4. On the other hand, the adjusting lens 14 moves so as to be apart from the concentrating lens by a mechanical deformation of the top plate of the TEC 8. Moreover, in the coupling system shown in FIG. 7B, because the adjusting lens 14 moves so as to be apart from the concentrating lens 4 as the temperature rises, which means the optical system approaches the configuration shown in FIG. 7A, the optical coupling efficiency to the optical fiber 5 enhances. Thus, the optical arrangement of FIG. 7B enhances the coupling efficiency as the increase of the ambient temperature. But, the optical arrangement of FIG. 7B oppositely decreases the coupling efficiency drastically as the decrease of the ambient temperature.

As for the coupling system shown in FIG. 7C, the coupling efficiency to the optical fiber 5 decreases as the increase of the ambient temperature because the adjusting lens 14 moves so as to be apart from the concentrating lens. However, the end of the optical fiber 5 approaches the focal point of the concentrating lens 4 as the increase of the ambient temperature, which results in the increase of the coupling efficiency with the optical fiber 5.

That is, the optical coupling system shown in FIG. 7C degrades the coupling efficiency as the increase of the temperature because the adjusting lens 14 moves apart from the concentrating lens 4, but the shift of the end of the optical fiber 5 close to the focal point of the concentrating lens 4, which enhances the coupling efficiency, may compensate the degradation of the coupling efficiency due to the shift of the adjusting lens 14. Also, when the temperature falls down, the shift of the adjusting lens 14 toward the concentrating lens 4 enhances the coupling efficiency but the shift of the end of the optical fiber 5 apart from the focal point of the optical fiber 5 may compensate the enhancement of the coupling efficiency. Accordingly, the optical arrangement shown in FIG. 7C, that is, the adjusting lens 14 is set closer to the pre-focusing lens 12 from the point, at which the focal point of the adjusting lens 14 does not coincide with the focal point of the pre-focusing lens 12 and the optical signal output from the adjusting lens 14 becomes dispersive, may improve the temperature dependence of the coupling efficiency, namely, the tracking error of the optical coupling system.

Figure 8A:
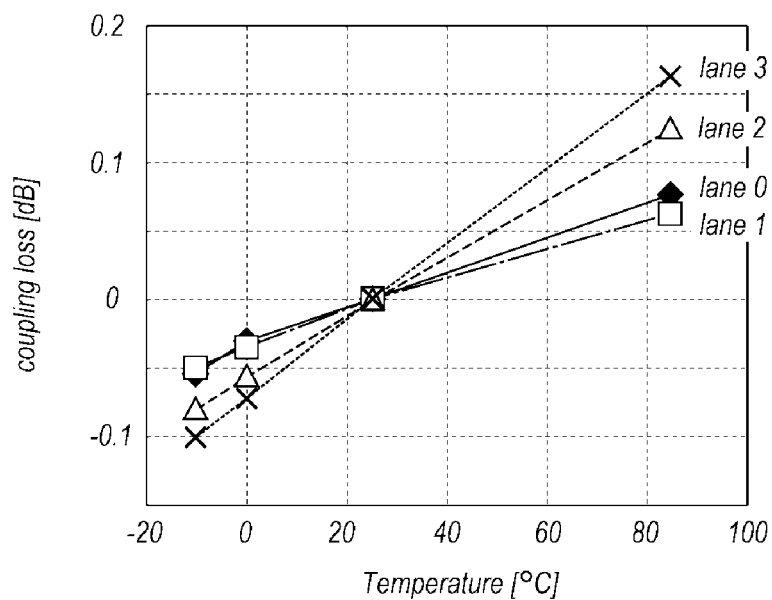
FIGS. 8A and 8B compares the optical coupling loss against the temperature, the tracking error, between two cases, the adjusting lens is set closer to the concentrating lens in FIG. 8A and to the pre-focusing lens in FIG. 8B.
Figure 8B:
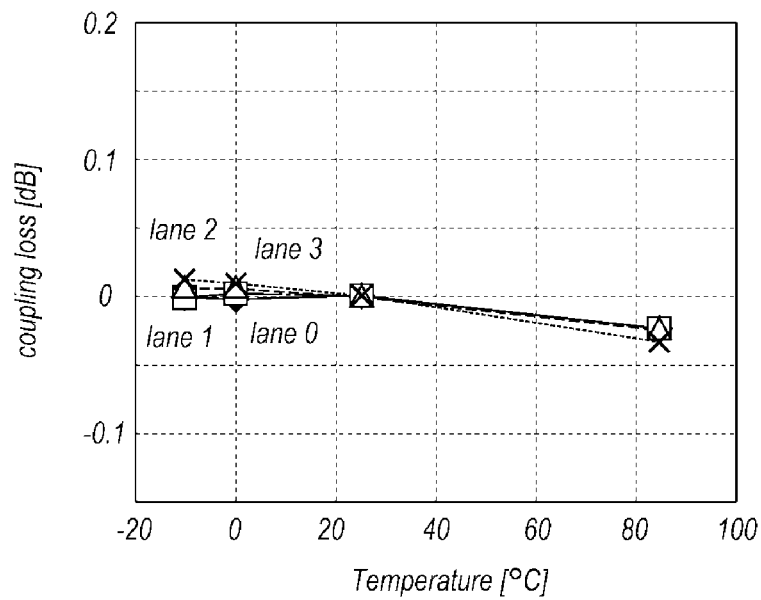

FIGS. 8A and 8B show the optical coupling efficiency (the coupling loss) against the temperature, where FIG. 8A corresponds to a case where the adjusting lens 14 is shifted toward the concentrating lens 4 to form the optical signal output from the adjusting lens 14 dispersive, and FIG. 8B corresponds to another case where the adjusting lens 14 is set closer to the pre-focusing lens 12 to make the optical signal output from the adjusting lens 14 to make the optical signal output from the adjusting lens 14 convergent. In FIGS. 8A and 8B, lane 0 corresponds to a lane of the LD 11d, that is, the optical signal output from the LD 11d advances straightly and couples with the optical fiber 5; lane 1 corresponds to the LD 11b multiplexed with the optical signal of the channel 1 by the second WDM filter 6; lane 2 corresponds to the LD 11c coupling with the optical fiber 5 after the internal reflection in the PBC 19; and lane 3 corresponds to the LD 11a whose optical signal is multiplexed by the optical signal of the LD 11c by the first WDM filter 15. Optical path lengths of the channels are 22.61, 23.52, 23.69, and 24.65 mm, respectively.

When the adjusting lens 14 is shifted toward the concentrating lens 4, as shown in FIG. 8A, large tracking errors are observed in all channels, and magnitudes of the tracking errors for respective channels also show large discrepancy. Thus, the optical coupling system with the adjusting lens 14 shifted toward the concentrating lens 4 has the coupling efficiency with the optical fiber 5 strongly depending on the temperature. This is because, as described above, the synergistic action that the end of the optical fiber 5 approaches the focal point of the concentrating lens 5 and the optical signal output from the adjusting lens approaches the collimated beam. The widely dispersed tracking error in FIG. 8A is due to the optical path lengths from the adjusting lens 14 to concentrating lens 4 are different in respective channels.

When the adjusting lens 14 is closer to the pre-focusing lens 12, as shown in FIG. 8B, the tracking errors become small in all channels and the variation of the tracking errors for respective channels become also small. In such an optical arrangement, the optical coupling efficiency is stabilized in small values and variations between respective coupling efficiencies also kept in small even when the temperature changes. This is because of the compensation of the shift of the adjusting lens 14 apart from the concentrating lens 4 by the shift of the optical fiber 5 toward the concentrating lens 4. That is, the degradation of the coupling efficiency caused by the shift of the adjusting lens 14 may be compensated by the enhancement of the coupling efficiency due to the shift of the optical fiber 5 toward the concentrating lens 4.

Second Embodiment

Figure 10:
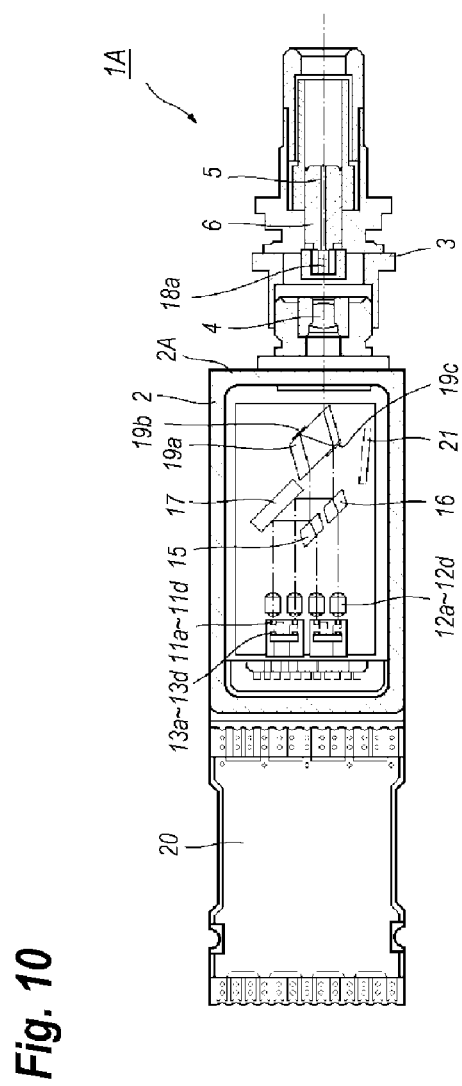
FIG. 10 is a plan view of another optical module according to the second embodiment of the present invention.

FIG. 10 is a plan view showing an optical transmitter module 1A according to the second embodiment of the present application. The optical module 1A also provides four lanes, where each lane includes the LD, 11a to 11d, as optical sources, the adjusting lens, 14a to 14d, and the monitor PDs, 13a to 13d. The base 7 mounts these optical components of the LDs, 11a to 11d, the adjusting lenses, 14a to 14d, and the optical coupling system thereon without installing the TEC 8 thereunder. A distinguishable feature of the optical transmitter module 1A is that the each lane omits the pre-focusing lenses, 12a to 12d, provided in the former optical transmitter module 1, and the PBC 19 is replaced by a beam combiner (BC) 19a.

That is, the LDs, 11a to 11d, generate the optical signals toward the adjusting lenses, 14a to 14d. Because the adjusting lenses, 14a to 14d, are placed on the respective positions such that the focal points in the side of the LDs, 11a to 11d, substantially coincide with the light-emitting points of the LDs, 11a to 11d, exactly, the focal points of the adjusting lenses, 14a to 14d, are slight offset from respective light-emitting points; the optical beams passing the respective adjusting lenses, 14a to 14d, become collimated beams. The optical system that processing the optical beams coming from the adjusting lenses, 14a to 14d, as shown in FIG. 10, combines four beams into one beam. Specifically, the optical beam from the first LD 11a is reflected toward the first WDM filter 15 by the mirror 17, and multiplexed with the third optical beam emitted from the third LD 11c by the first WDM filter 15.

The optical beam output from the second LD 11b is reflected toward the second WDM filter 16 also by the mirror 17, and multiplexed with the fourth optical beam output from the fourth LD 11d. Two multiplexed optical beams enter the BC 19a to be combined thereby. Specifically, the former multiplexed optical beam, which includes those from the first LD 11a and the third LD 11c, enters the BC 19a from one surface and wholly reflected at another surface thereof toward the former surface. The surface of the BC 19a may provide the high reflection (HR) coating 19b. On the other hand, a portion of the surface of the BC 19a, where the latter multiplexed optical beam coming from the second WDM filter 16 enters, has a half mirror 19c. The optical beam coming from the HR coating 19b is half reflected at the half mirror 19c, while, the optical beam coming from the second WDM filter 16 half passes the half mirror 19c. Accordingly, the BC 19a may output a combined optical beam including the first to fourth optical beams. The combined optical beam passes the front wall 2A of the housing 2 and concentrated by the concentrating lens 4 onto the end of the optical fiber 5 provided in the coupling portion 3.

Thus, the optical transmitter module 1A of the present embodiment replaces the PBC 19 into the BC 19a to combine four optical beams without converting the polarizations of the optical beams, which may considerably simplify the optical system. No polarization rotator, which is integrated with the optical isolator 18 in the first embodiment, is required. Instead, the half mirror 19c in the BC 19a causes a substantial optical loss for respective multiplexed beams coming from the WDM filters, 15 and 16. That is, the first multiplexed beam coming from the first WDM filter 15 is half reflected by the half mirror 19c but half transmitted therethrough, and the second multiplexed beam coming from the second WDM filter 16 is half transmitted through the half mirror 19c but half reflected thereby. Because the optical beams output from the adjusting lenses, 14a to 14d, are substantially collimated beams; a portion of the former multiplexed optical beam transmitted through the half mirror 19c and a portion of the latter multiplexed optical beam reflected by the half mirror 19c become stray beam leaving substantial intensity. Accordingly, the optical transmitter module 1A of the present embodiment provides an optical absorber 21 to absorb the stray components of the multiplexed optical beams transmitted through and reflected by the half mirror 19c.

Also, the optical transmitter module 1A of the present embodiment provides the optical isolator 18a in the coupling portion 3 not within the optical system. As described above, the optical system of the present embodiment is independent of the polarization of the optical beams. That is, the optical beams output from respective LDs, 11a to 11d, maintain the polarization thereof as those of the LDs, 11a to 11d. Specifically, the polarizations of the respective optical beams are in parallel to the lateral and longitudinal directions of the optical beams, namely, in parallel to the bottom of the housing 2. The optical isolator 18a in the optical coupling portion 3, which may be a type of the polarization dependent optical isolator, only passes optical signals whose polarization is in parallel to the lateral direction and cuts optical signals whose polarizations are not in parallel to the lateral direction.

Furthermore, the optical transmitter module 1A of the present embodiment provides monitor PDs, 13a to 13d, in the rear of respective LDs, 11a to 11d. When PDs are set in the front of the LDs, 11a to 11d, namely, downstream of the adjusting lenses, 14a to 14d, as those of the first embodiment, backward light reflected at the surface of the PDs become significant, which degrades the performance of the optical transmitter module 1A, because the optical beams output from the adjusting lenses, 14a to 14d, are substantially collimated. Accordingly, the optical transmitter module 1A of the present embodiment installs the monitor PDs, 13a to 13d, in the rear of respective LDs, 11a to 11d. The PDs, 13a to 13d, are mounted on a side of sub-mounts that crossover the interconnections drawn to the LDs, 11a to 11d.

The optical transmitter module 1A thus described provides the BC 19a integrating the HR coating 19b with the half mirror 19c in a body material transparent to the optical beams. However, the BC 19a may divide the HR coating 19b from the half mirror 19c. This arrangement may enhance the accuracy of the optical alignment of two components, 19b and 19c.

In the optical transmitter module 1A, the optical output power of respective LDs, 11a to 11d, coupled to the optical fiber 5 may be adjusted by offsetting the adjusting lenses, 14a to 14d, from the position at which the focal points of the adjusting lenses, 14a to 14d, coincide with the ends of the LDs, 11a to 11d, namely, the light-emitting points thereof. That is, the optical arrangement of the present optical transmitter module 1A is same as that of the aforementioned embodiment assuming that the light-emitting points of the LDs, 11a to 11d, move to the focal points of the pre-focusing lenses, 12a to 12d, because the pre-focusing lenses, 12a to 12d, function as the concentrating lens. The pre-focusing lenses, 12a to 12d, have the magnification ratio of 5 to 6, which means that the aperture of the optical beams output from the pre-focusing lenses, 12a to 12d, become moderated and the adjusting lenses, 14a to 14d, become flexible in the optical alignment thereof. That is, the optical alignment of the adjusting lenses, 14a to 14d, show relatively greater tolerances. In the present optical transmitter module 1A, the adjusting lenses, 14a to 14d, directly couple with the LDs, 11a to 11d, and the apertures of the optical beams output from the LDs, 11a to 11d, are precipitous, which means that the optical alignment of the adjusting lenses, 14a to 14d, are sensitive. However, the removal of the pre-focusing lenses, 12a to 12d, and some other optical components may lower the cost of the optical transmitter module 1A.

Procedures to adjust the optical output power of respective LDs, 11a to 11d, coupled to the optical fiber 5 are substantially same with those of the first embodiment. That is, the first LD 11a installed within the housing 2 is practically activated and the adjusting lens 14a is first positioned at which the optical beam output from the adjusting lens 14a becomes collimated. That is, the adjusting lens 14a is set on the position where the focal point of the adjusting lens 14a substantially coincides with the light-emitting point of the LD 11a. Then, offsetting the adjusting lens 14a toward the LD 11a, which means that the optical beam output from the adjusting lens 14a becomes slightly dispersive, the optical power detected through the optical fiber 5 becomes preset power. Iterating the procedures thus described for other LDs, 11b to 11d, and other adjusting lenses, 14b to 14d, all lanes in the optical output power coupled with the optical fiber may be adjusted. In the optical transmitter module 1A shown FIG. 10, respective LDs, 11a to 11d, are driven by external signals provided through a flexible printed circuit (FPC) board 20, and no driver circuit for the LDS, 11a to 11d, are implemented within the housing 2.

In the foregoing detailed description, the present invention has been described with reference to specific exemplary embodiments thereof. It will, however, be evident that various modifications and changes may be made thereto without departing from the broader spirit and scope of the present invention. For example, the explanation concentrates on the optical transmitter module implementing four channels, that is, the optical transmitter module installs four LDs, 11a to 11d, four pre-focusing lenses, 12a to 12d, and four adjusting lenses, 14a to 14d. However, the present invention may be applicable to an optical transmitter module that implements two channels and or fiber or more channels. Accordingly, the present specification and figures are to be regarded as illustrative rather than restrictive.

What is claimed is:

1. A method of assembling an optical transmitter module that includes a concentrating lens and a plurality of lanes each including a laser diode (LD) that emits an optical signal, a pre-focusing lens, and an adjusting lens, the concentrating lens concentrating optical signals attributed to the lanes onto an optical fiber, the method comprising steps of:
   (a) placing the pre-focusing lens in a position at which the pre-focusing lens concentrates the optical signal output from the LD by a magnification ratio of 5 to 6;
   (b) placing the adjusting lens on a point at which the optical signal output from the LD and passing through the adjusting lens becomes a collimated beam;
   (c) shifting the adjusting lens toward the LD such that the optical signal detected through the optical fiber that optically couples with the adjusting lens through the concentrating lens becomes a preset magnitude, the adjusting lens showing a magnification ratio of substantially unity at a position where the optical signal detected through the optical fiber becomes the preset magnitude; and
   iterating the step (a) to the step (c) for the respective lanes.

2. The method of claim 1,
   wherein the optical transmitter module further includes a housing and an optical coupling portion, the housing enclosing the lanes therein, the optical coupling portion including the concentrating lens and the optical fiber therein,
   wherein the step of placing the adjusting lens in the respective iteration includes steps of:
      extracting the optical signal passing through the adjusting lens out of the housing, monitoring the extracted optical signal at a point enough far from the housing; and
aligning the adjusting lens such that the extracted optical signal monitored far from the housing becomes a collimated beam.

3. The method of claim 2,
further including steps of:
before the step of shifting the adjusting lens in a first iteration for one of the lanes,
attaching a tool to the housing, the tool having a lens and an optical fiber that imitate the concentrating lens and the optical fiber, respectively;
detecting the optical signal passing through the adjusting lens through the lens and the optical fiber in the tool; and
setting the adjusting lens in a position at which the optical signal detected through the optical fiber in the tool becomes the preset magnitude.

4. The method of claim 3,
further including steps of:
after a final iteration,
detaching the tool from the housing;
attaching the coupling portion to the housing; and
aligning the coupling portion with respect to the housing such that the optical signals for respective lanes detected through the optical fiber in the coupling portion become the preset magnitude.

5. The method of claim 1,
wherein the optical transmitter module further includes a thermo-electric cooler (TEC), a housing, and a coupling portion, the housing installing the TEC that mounts the respective lanes thereon, the coupling portion being attached to the housing and securing the optical fiber and the concentrating lens therein,
wherein the method further includes steps of:
before the step of placing the pre-focusing lens, placing the LD at a preset position on the TEC, and activating the LD by supplying a bias current thereto for the respective lanes, and
wherein the step of placing the pre-focusing lens includes steps of:
placing the pre-focusing lens at a position where the optical signal output from the LD and passing through the pre-focusing lens becomes a collimated beam, and
shifting the pre-focusing lens apart from the position by a preset distance where the pre-focusing lens concentrates the optical signal output from the LD by the magnification ratio of 5 to 6.

6. The method of claim 5,
wherein the step of placing the pre-focusing lens includes steps of:
extracting the optical signal passing through the pre-focusing lens outside of the housing;
monitoring the extracted optical signal at a point enough far from the housing; and
shifting the pre-focusing lens such that the extracted optical signal becomes the collimated beam.

7. A method of assembling an optical transmitter module that includes a plurality of lanes and a housing, the lanes each including a laser diode (LD) that emits an optical signal, a pre-focusing lens, and an adjusting lens, the housing enclosing the lanes, the method comprising steps of:
attaching a tool to the housing, the tool having a lens and an optical fiber;
for respective lanes, iterating steps of:
placing the LD in a preset position;
placing the pre-focusing lens in a position at which the pre-focusing lens concentrates the optical signal output from the LD by a magnification ratio of 5 to 6;
placing the adjusting lens on a point at which the optical signal output from the LD and passing through the adjusting lens becomes a collimated beam; and
shifting the adjusting lens toward the LD such that the optical signal detected through the optical fiber through the lens in the tool becomes a preset magnitude, wherein the adjusting lens shows a magnification ratio of substantially unity at a position where the optical signal detected through the optical fiber becomes the preset magnitude;
replacing the tool with a coupling portion that includes a concentrating lens and another optical fiber; and
aligning the coupling portion with respect to the housing such that the optical signal for one of the lanes detected through the another optical fiber in the coupling portion becomes the preset magnitude.

8. The method of claim 7,
wherein the step of placing the adjusting lens in the respective iteration includes steps of:
extracting the optical signal passing through the adjusting lens out of the housing,
monitoring the extracted optical signal at a point enough far from the housing; and
adjusting the adjusting lens such that the extracted optical signal monitored far from the housing becomes a collimated beam.

9. The method of claim 7,
wherein the housing further encloses a thermo-electric cooler (TEC) therein,
wherein the steps of placing the LD, placing the pre-focusing lens, and placing the adjusting lens include steps of placing the LD, the pre-focusing lens, and the adjusting lens on the TEC.

10. The method of claim 7,
wherein the step of placing the pre-focusing lens for the respective lanes includes steps of:
extracting the optical signal output passing through the pre-focusing lens out of the housing;
monitoring the optical signal extracted from the housing at a point enough far from the housing; and
shifting the pre-focusing lens such that the optical signal monitored far from the housing becomes the collimated beam.

* * * * *